No. 658,556. Patented Sept. 25, 1900.
W. A. PITT.
ROTARY ENGINE OR MOTOR.
(Application filed Apr. 5, 1899. Renewed Aug. 23, 1900.)

(No Model.) 3 Sheets—Sheet 1.

WITNESSES: INVENTOR.
William A. Pitt
BY
ATTORNEY.

THE NORRIS PETERS CO., PHOTO-LITHO., WASHINGTON, D. C.

No. 658,556. Patented Sept. 25, 1900.
W. A. PITT.
ROTARY ENGINE OR MOTOR.
(Application filed Apr. 5, 1899. Renewed Aug. 23, 1900.)
(No Model.) 3 Sheets—Sheet 2.
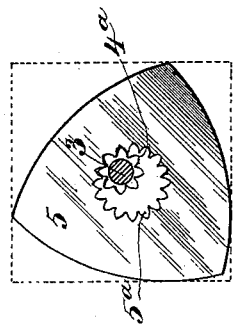
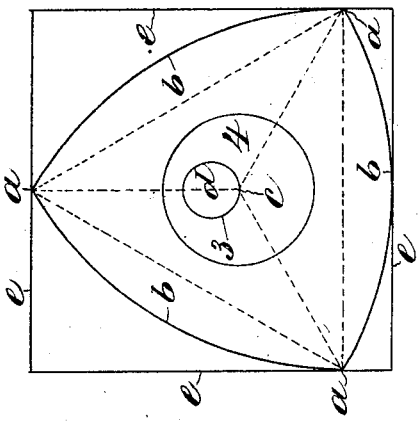
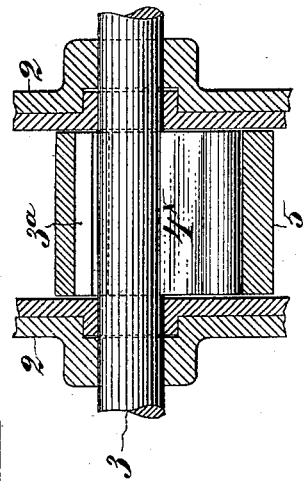
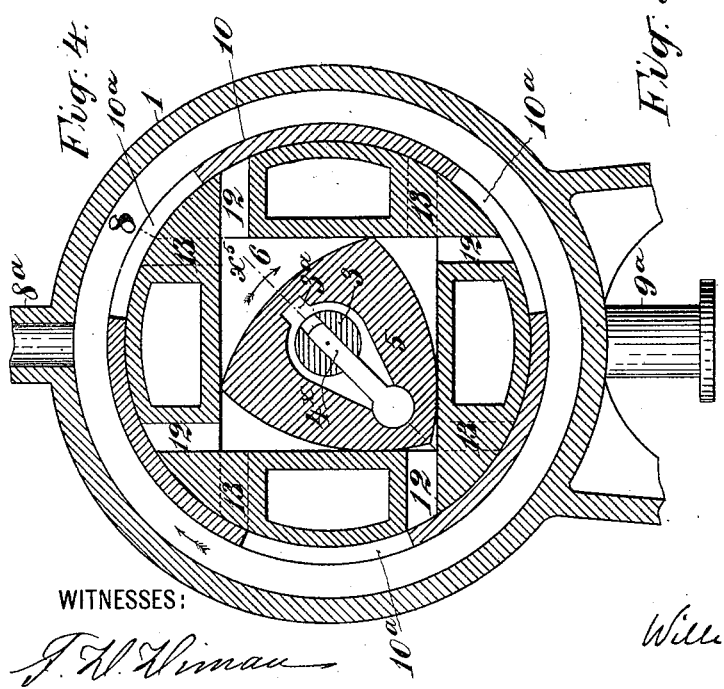
WITNESSES:
INVENTOR
William A. Pitt
BY
Henry Connett
ATTORNEY

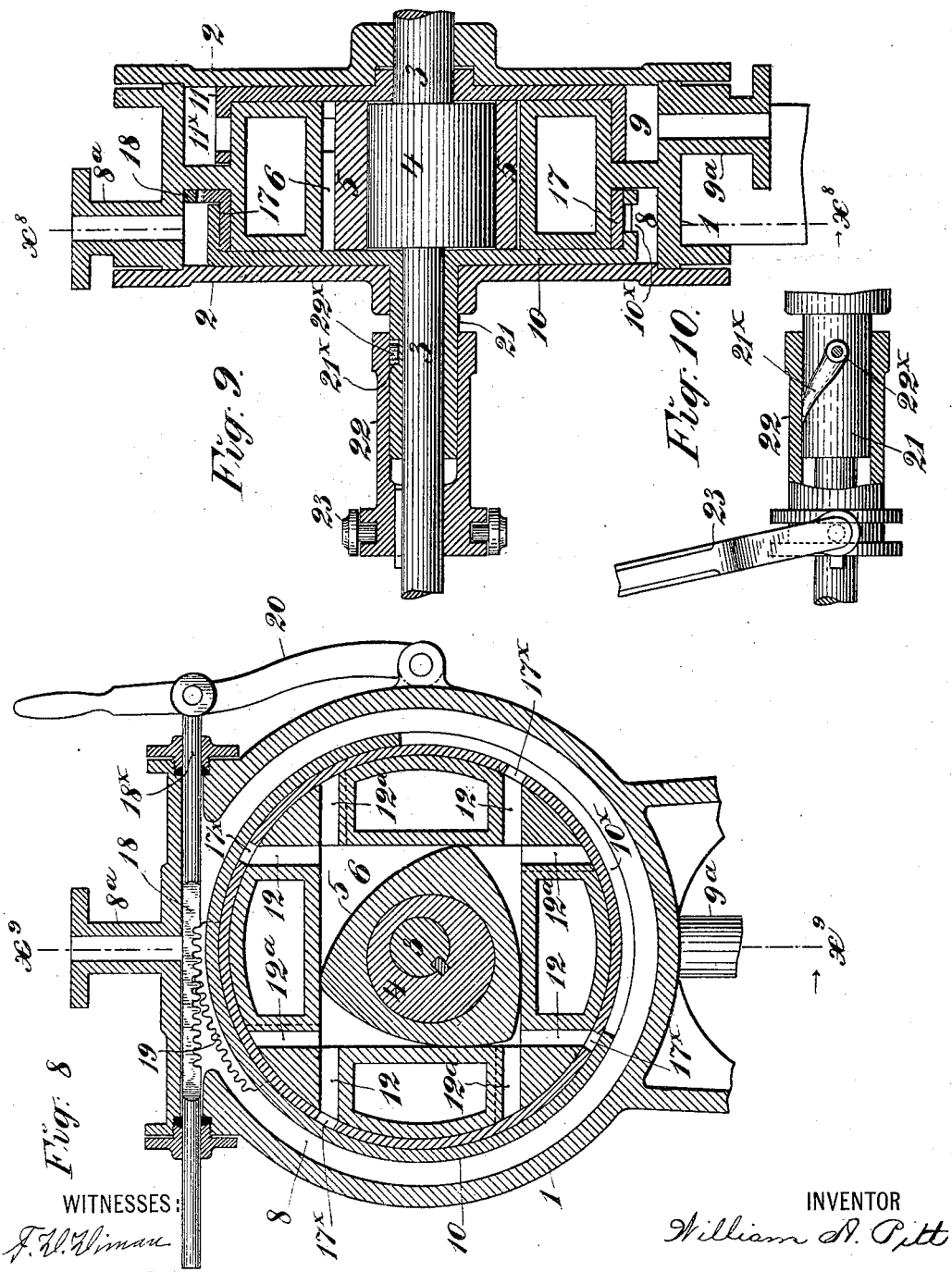

UNITED STATES PATENT OFFICE.

WILLIAM A. PITT, OF MANHASSET, NEW YORK.

ROTARY ENGINE OR MOTOR.

SPECIFICATION forming part of Letters Patent No. 658,556, dated September 25, 1900.

Application filed April 5, 1899. Renewed August 23, 1900. Serial No. 27,820. (No model.)

*To all whom it may concern:*

Be it known that I, WILLIAM A. PITT, a citizen of the United States, residing at Manhasset, in the county of Nassau and State of New York, have invented certain new and useful Improvements in Rotary Engines or Motors, of which the following is a specification.

This invention relates to the class of rotary motors wherein a fluid under tension is adapted to act on a rotatively-moving piston or pistons to impart a rotary motion to a shaft coupled in some manner to said piston or pistons.

The accompanying drawings illustrate embodiments of the invention.

Figure 3:
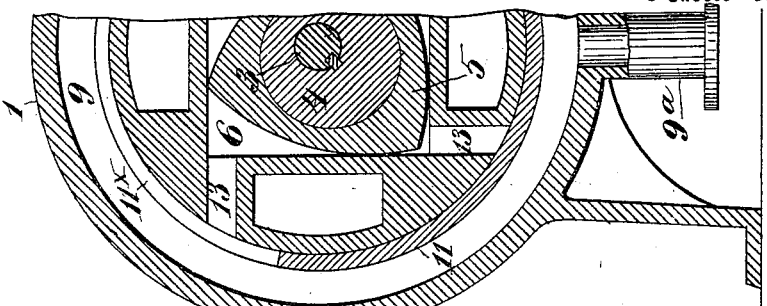
Figure 2:
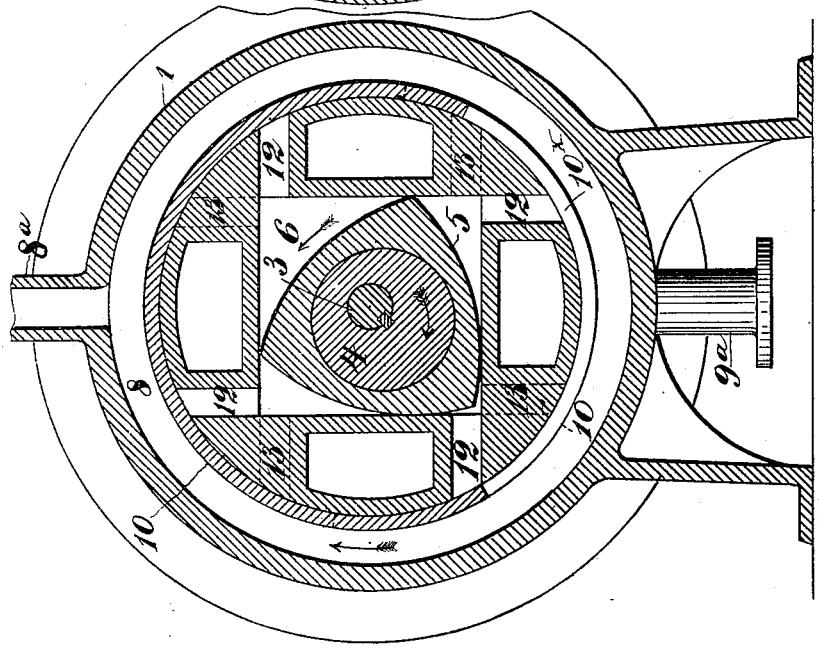
Figure 1:
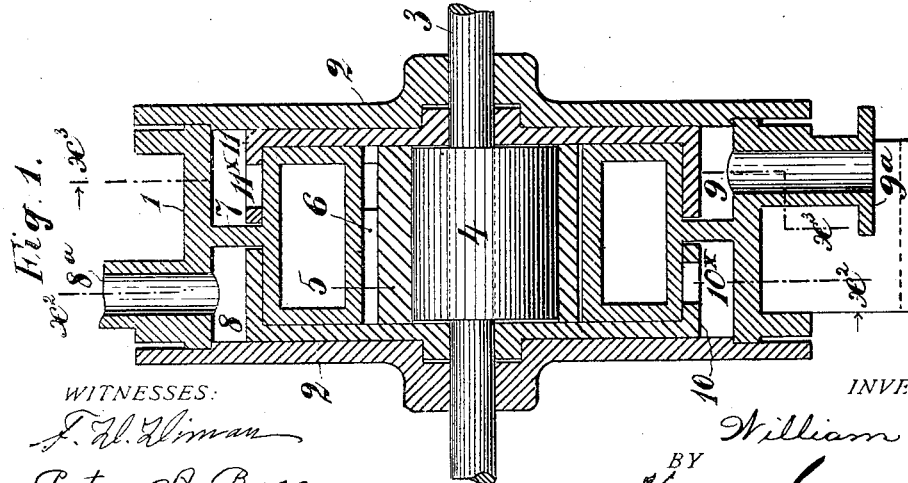

Figure 1 is a diametrical section of the device adapted to serve as a rotary engine. Fig. 2 is a section of same at line $x^2$ in Fig. 1, and Fig. 3 is a section at line $x^3$ in Fig. 1. Fig. 4 illustrates a modification of the engine wherein the equilateral-triangular piston rotates synchronously with the shaft. Fig. 5 is a section at line $x^5$ in Fig. 4. Fig. 6 illustrates a modification of the engine, showing another means for coupling the piston to the shaft. Fig. 7 is a diagram illustrating the relative proportions of the parts and the manner of obtaining the proper form of the triangular piston. Figs. 8, 9, and 10 illustrate the application of a reversing mechanism to the engine illustrated in Figs. 1, 2, and 3. Fig. 8 is a section on line $x^8$ in Fig. 9. Fig. 9 is a section in the plane of the line $x^9$ in Fig. 8, and Fig. 10 is a sectional plan of the mechanism for reversing by rotation of the valve.

In the several views like reference characters designate like parts throughout the several constructions when the parts are unmodified.

Referring, primarily, to Figs. 1, 2, and 3, 1 is the engine body or cylinder.

2 are the heads or covers, bolted to the faces of said cylinder, and 3 is a shaft mounted rotatively in the said cylinder and its heads. On the shaft 3 within the cylinder is keyed an eccentric 4, and on this eccentric is rotatively mounted a triangular body or piston 5. This piston is of equilateral-triangular form, with convex or arched faces, the curvature of which have, as shown in these views, radii equal to the chord subtending the arc, or, in other words, equal to a straight line drawn from one angle to either of the others. This triangular piston turns within a square chamber 6, formed in the cylinder 1 and through the center of which the shaft 3 extends. The length of a side of this square chamber 6 is equal to that of a straight line drawn from one angle of the piston 5 to another. The eccentricity of the eccentric 4 is equal to the distance measured in a straight line from the center of the shaft 3 to the center of the triangular piston 5.

The manner of proportioning the parts will be seen by inspection of the diagram, Fig. 7. In this view $a\ a\ a$ are the vertices of the equilateral triangle; $b\ b\ b$, the respective sides thereof. $c$ is the center thereof, which is coincident with the center of the eccentric 4, and $d$ is the center of the circumscribed square $e\ e\ e\ e$, which is coincident with the axis of the shaft 3.

Exterior to and about the chamber 6 and concentric with the shaft 3 are two annular chests for the steam or other fluid, said chests being separated circumferentially by a partition 7 into an induction-chamber 8 and an eduction-chamber 9, the former having an inlet $8^a$ and the latter an outlet $9^a$.

10 is an annular inductive-valve keyed to the shaft 3 at its boss, and 11 is an annular eduction or exhaust valve also keyed to the shaft 3 at its boss. Thus the valves rotate with and in the same direction as the shaft 3 and eccentric 4; but the piston 5 rotates in the opposite direction and at one-third the speed of the shaft 3.

There are four inlet ports or passages 12, situated near the angles of the chamber 6 and seen best in Fig. 2. These are controlled by the valve 10, which has one induction-port $10^\times$, (seen in Fig. 2,) and there are four exhaust or eduction ports or passages 13. (Seen in dotted lines in Fig 2 and two of them in full lines in Fig. 3.) These ports are controlled by the valve 11, which has one exhaust-port $11^\times$. Where expansion and compression are not taken into consideration the inlet-port $10^\times$ of the valve 10 will extend one hundred and twenty degrees or one-third the way about the circumference of the valve, and the exhaust-port 11^X will extend also one hundred and twenty degrees or one-third the way about the circumference of the valve 11.

The engine operates as follows: Steam or other fluid being admitted, it acts directly upon the piston 5 to turn it in the chamber 6, and as it turns it exerts a wedging action on the eccentric 4 to rotate it. The piston 5 in turning once rotates the shaft 3 three times and in the opposite direction. As the piston rotates about the eccentric and the eccentric rotates about the axis of the shaft the piston will have a rolling gyratory motion, its angles maintaining their contact with the four plain sides of the chamber 6 except at the extreme angles of said chamber, and these angles might be filled with fillets or easements, if desired, so that the angles of the piston would be in contact with the wall of the chamber all the way around.

Fig. 4 is a section similar to Fig. 2, showing the same construction as that figure, except in the points that will be noted. The eccentric 4 is omitted, and the piston 5 loosely embraces the shaft 3. It is coupled directly to the shaft by a radial link 4^X, which plays through a mortise 3^a in the shaft and is hinged in the piston. In this construction the piston and shaft move in the same direction and make the same number of revolutions. The induction-valve 10 has three equidistant ports 10^a, and the eduction-valve (not shown) has also three equidistant ports. Fig. 5 is a section through the piston 5 of Fig. 4, showing the link 4^X in elevation.

Fig. 6 illustrates a third means for coupling the piston 5 to the shaft 3. This means comprises a pinion 4^a, fixed on the shaft and gearing with internal gear-teeth 5^a on the piston. There are twice as many teeth in the piston as on the pinion, and the shaft rotates in the same direction as the piston and at three times the speed of the piston.

The engine-body 1 has been called a "cylinder" herein merely for the reason that in engines this part is commonly a cylinder and is universally called the "cylinder." As shown in Figs. 2, 3, and 4, it is cylindrical exteriorly; but this is only for convenience. It may have any external form. The cylinder 1 has been made open through and provided with two heads for convenience of dressing the interior surfaces, and the two valves 10 and 11 are made non-integral and secured separately to the shaft 3 merely to permit the web or partition 7 to integrally connect the outer and inner parts of the cast cylinder or engine-body.

The several means for coupling the triangular body to the shaft for reciprocal driving are obviously interchangeable. For example, the gear shown in Fig. 6 may be substituted for the eccentric shown in Fig. 2, and vice versa.

In Figs. 8, 9, and 10 is shown a means for reversing the engine constructed as shown in Figs. 1, 2, and 3. In this construction a ring-like port-plate 17 is interposed between the induction-valve 10 and the cylindrical surfaces over which said valve plays, and in this port-plate are four ports 17^X, adapted to coincide either with the regular port-passages 12 or with extra reversing port-passages 12^a. The port-plate 17 is shifted for reversing by some suitable mechanism. That herein shown comprises a sliding rack 18, the teeth of which gear with teeth 19 on the upturned flanged edge of the port-plate 17. The stem 18^X of the rack passes out through a stuffing-box on the cylinder and may be operated by a lever 20. In reversing, however, the valve 10 must also be shifted one hundred and twenty degrees in the direction the shaft 3 is rotating, and this shifting may be effected by the means illustrated in Figs. 9 and 10. The valve 10 has a sleeve-boss 21, which embraces the shaft 3, extends out through the head of the cylinder, and is provided with a spiral or oblique groove or channel 21^X, extending one-third around said sleeve. Splined on the shaft 3 is a shifting sleeve 22, which extends over the sleeve of the valve and carries a stud 22^X, which engages the slot 21^X. The shifting sleeve 22 has a circumferential groove engaged by the forked end of a shifting lever 23 or other equivalent device.

Being the first, as I believe, to employ in a motor or engine a rotary piston of this character turning in a square chamber or cylinder I do not restrict myself to any special mechanical details employed in the application of these features to the purpose. The essential features of the invention are the square chamber provided with suitable ports for the passage of the fluid, the shaft rotatively mounted in and extending through the center of said chamber, the triangular piston in said chamber, and means whereby the rotation of the piston drives and rotates the shaft.

Having thus described my invention, I claim—

1. A motor comprising a rotatable shaft extending through the center of a square chamber provided with ports for the flow of a fluid under tension, the said chamber, an equilateral-triangular piston within said square chamber, said piston having the proportions respecting said chamber herein specified, and means connecting said shaft and piston for driving one from the other, substantially as set forth.

2. A motor comprising a rotatable shaft extending through the center of a square chamber provided with ports for the flow of a fluid under tension, the said chamber, an equilateral-triangular piston within said square chamber, said piston having the proportions respecting said chamber herein specified, and an eccentric fixed on said shaft and fitting an aperture in the center of said piston, substantially as set forth.

3. A motor comprising an engine-body having in it a square chamber, an inductionor chamber, four induction-ports connecting said chambers, an eduction chest or chamber, four eduction-ports connecting the square chamber with said eduction-chamber, a shaft extending through the center of said square chamber and having tight bearings in the cylinder-heads, ported and rotatable valves in the respective induction and eduction chambers and fixed to said shaft, an equilateral-triangular piston in said square chamber and having the proportions relatively thereto as herein specified, and means connecting said shaft and triangular body for reciprocal driving, substantially as set forth.

4. A motor comprising an engine-body having in it a square chamber 6, an induction-chamber 8, with an inlet, an eduction-chamber 9, with an outlet, four induction-ports connecting the induction-chamber with said chamber 6, and four eduction-ports connecting the eduction-chamber with said chamber 6, a rotatable shaft extending through the center of said chamber 6 and having tight bearings in the heads of the engine-body, induction and eduction valves carried with said shaft and controlling the respective induction and eduction ports, an eccentric 4, on the said shaft and in the chamber 6, and an equilateral-triangular piston 5, in said chamber and embracing said eccentric, the said piston, eccentric and square chamber having the relative proportions herein specified.

5. A motor comprising a rotatable shaft extending through the center of a closed, square chamber, the said chamber, an equilateral-triangular piston 5, within said chamber and embracing said shaft, an eccentric fixed on said shaft and occupying and fitting an aperture in said piston, a rotary valve controlling the exhaust-ports from said chamber, a rotary, shiftable valve controlling the induction-ports of said chamber and carried by the shaft, a port-plate 17, controlling the induction-ports for reversing, means for shifting the induction-valve with respect to the shaft, for reversing, and means for shifting the said port-plate for reversing, substantially as set forth.

In witness whereof I have hereunto signed my name, this 15th day of March, 1899, in the presence of two subscribing witnesses.

WILLIAM A. PITT.

Witnesses:
PETER A. ROSS,
HENRY CONNETT.